United States Patent [19]

Raskin

[11] 4,420,985
[45] Dec. 20, 1983

[54] FORCE MEASUREMENT DEVICE

[76] Inventor: Seymour H. Raskin, 7333 Rustic Valley Dr., Dallas, Tex. 75248

[21] Appl. No.: 202,460

[22] Filed: Oct. 31, 1980

Related U.S. Application Data

[62] Division of Ser. No. 37,133, May 8, 1979, abandoned.

[51] Int. Cl.³ .............................................. G01L 1/22
[52] U.S. Cl. .................................................. 73/862.66
[58] Field of Search ............ 73/862.66, 862.65, 862.67

[56] References Cited

U.S. PATENT DOCUMENTS

| | | | |
|---|---|---|---|
| 2,859,613 | 11/1958 | Green . | |
| 3,439,761 | 4/1969 | Laimins | 177/211 |
| 3,754,438 | 8/1973 | Matson | 73/862.65 |
| 3,837,222 | 9/1974 | Raskin . | |
| 4,020,911 | 5/1977 | English et al. | 73/862.65 X |

FOREIGN PATENT DOCUMENTS 974519 11/1964 United Kingdom .

Primary Examiner—Jerry W. Myracle
Attorney, Agent, or Firm—Gerald G. Crutsinger; John F. Booth; Monty L. Ross

[57] ABSTRACT

A force measurement device including one or more beams (21) to which tension strain gages (101 and 104) and compression strain gages (102 and 103) are secured. The strain gages are connected in a Wheatstone bridge circuit (FIG. 3) to deliver an output signal related to the magnitude of force supported by the beams. Each of the beams (21) has rigid flange portions (22 and 23) to permit welding (37) ends of the beams to supports (38) and load receiving members (40) at points far removed from the neutral axis (x—x) of each beam to minimize influence of welding on beam deflection.

6 Claims, 19 Drawing Figures

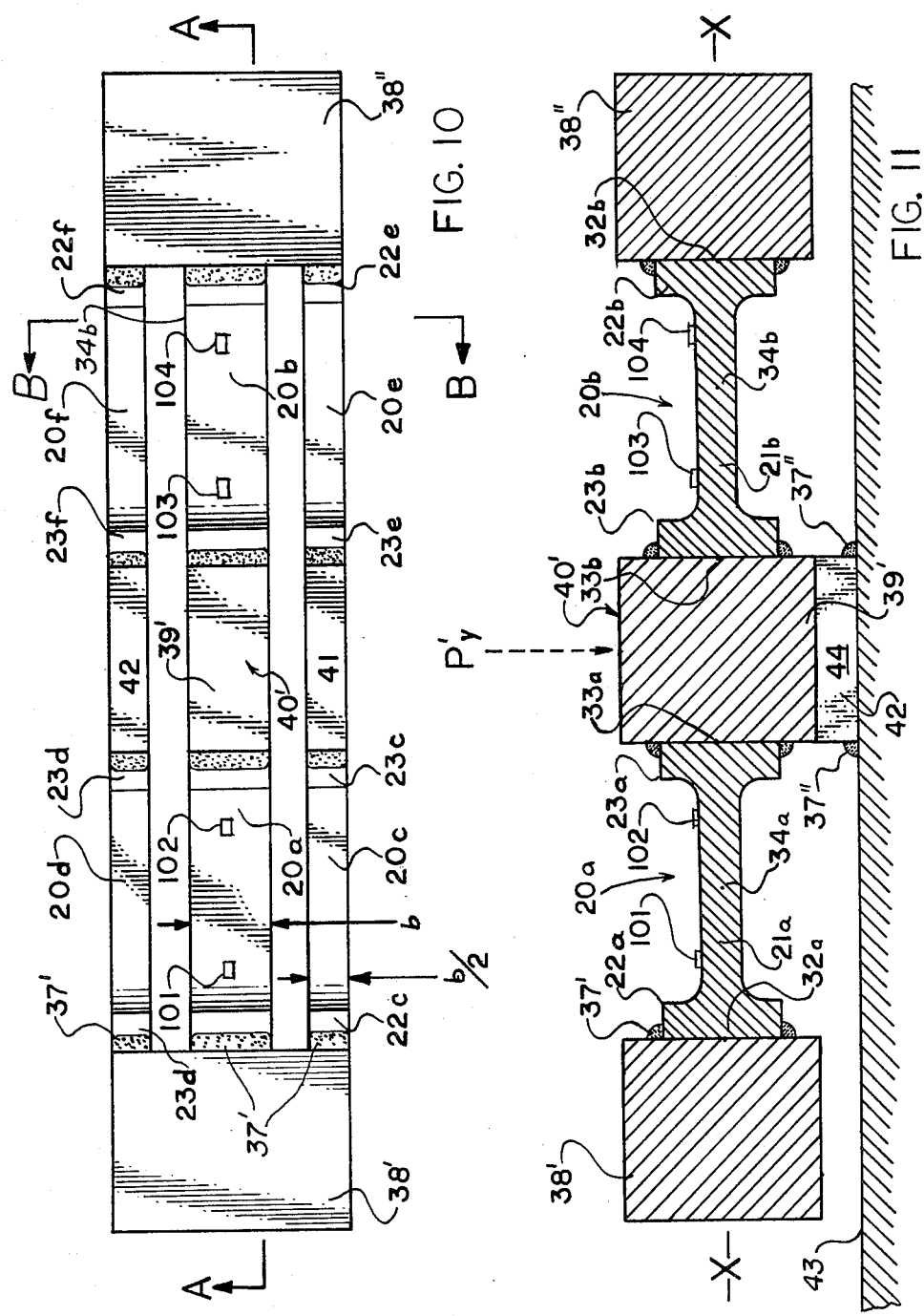

FORCE MEASUREMENT DEVICE

This application is a division of application Ser. No. 037,133, filed May 8, 1979 now abandoned.

BACKGROUND

This invention relates to a device for measuring force acting parallel to one selected axis, wherein the device is substantially insensitive to force vectors acting in any directions which are not parallel to the selected axis.

More specifically, this invention provides load-sensitive operator members, each of which operator members have a flexure beam portion, yet all the externally applied load forces and support forces are isolated from the flexure beam portion.

Moreover, the simple construction of the device provides for assembly by means of welding, if desired, where all welds to either provide support of the load receiving member or to fix supporting structure to a rigid base are far removed from the neutral axis of the flexural members.

Finally, the structure of this device is arranged so that the flexural members are subjected to bending stresses proportional to the applied load, but torsional stresses are minimized. The device relates to improvements in devices of the type disclosed in U.S. Pat. No. 3,837,222.

The teaching of U.S. Pat. No. 3,837,222 recognizes that the welded attachment of a support block or support post to a planar flexure beam of uniform cross section rigidifies the beam member against bending along the length of attachment. Said patent further teaches that the relationship between rigidity of the beam member and rigidity of laterally disposed bearing members is critical. Welded attachment of the support post is made as close to the neutral axis as practical, in order to minimize extraneous forces which may be imposed by action of the welds on a deflecting planar beam member.

The present invention provides for all welds to be located on portions of the variable thickness that are so rigidified and are so far removed from potential areas of influence on bending of the neutral axis that extraneous forces imposed by the welds will act only in areas where substantially no flexure is occurring due to the force being measured.

Finally, the present invention provides for support of the side bearing members of the operator member in a manner that eliminates introduction of tensional forces into the side members by the supporting base.

BRIEF DESCRIPTION OF THE DRAWINGS

Other objects and advantages of the invention will become apparent upon reading the following detailed description and upon reference to the drawings, wherein like reference characters are used throughout to designate like parts:

FIG. 10 is an elevational view of a second embodiment of the present invention having a pair of load-sensitive operator members connected to a relatively rigid support structure;

FIG. 11 is a cross-sectional view of the pair of operator members shown in FIG. 10 taken in the direction of arrows A—A;

DESCRIPTION OF A PREFERRED EMBODIMENT

Figure 1:
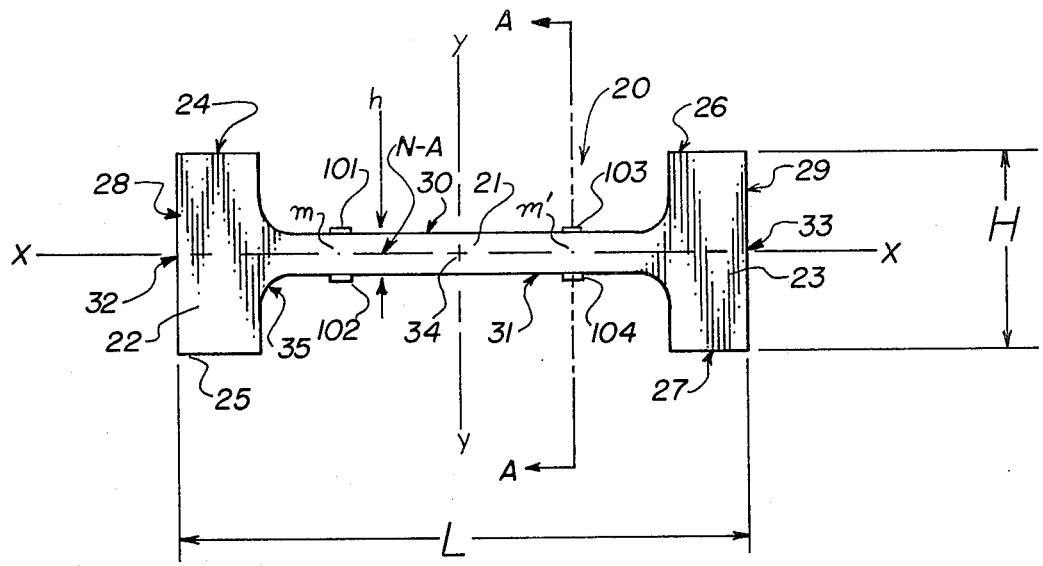
FIG. 1 is an elevational view of a load-sensitive operator member constructed according to the present invention.
Figure 2:
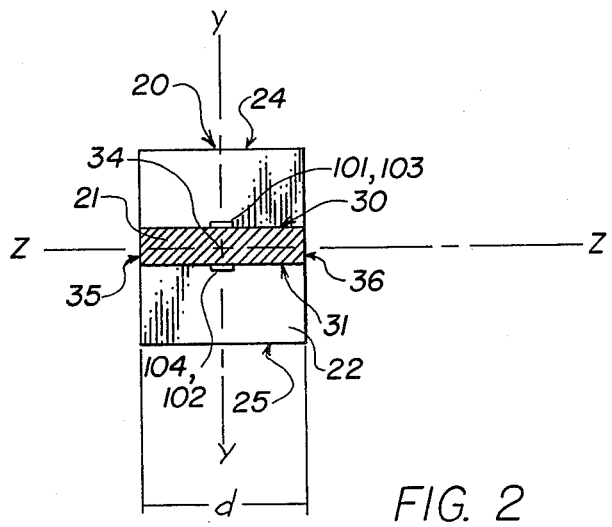
FIG. 2 is a cross-sectional view of the load-sensitive operator member shown in FIG. 1 taken in the direction of arrows A—A.

Now referring to the drawings, FIGS. 1 and 2 show one load-sensitive operator member 20 which is common to all embodiments of my invention. Flexure beam portion 21 has a neutral axis x-x which will bend in a manner proportional to an applied vertical load in the y-y direction, as will be described later.

Strain gages 101 and 102 are attached to surfaces 30 and 31, respectively, to measure stresses acting on point m. Strain gages 103 and 104 similarly measure stresses at point m'.

The flexure beam portion 21 is provided with a relatively rigid flange portion at each of its ends, where one flange portion is the support member 22 and the other flange portion is the load input member 23. Support face 28 is in a plane parallel to load input face 29, both of which faces are parallel to axis y-y. Neutral axis x-x passes through points 32 and 33.

In FIG. 2 it can be seen that the cross-sectional areas of support member 22, defined by surfaces 24, 25, 35 and 36, is large in relation to the cross-sectional area of beam portion 21, as is the area of input member 23. The bending stiffness of each of members 22 and 23 has a relationship to the stiffness of beam member 21 as $H^3/h^3$. The overall length of the operator member is L.

It can be seen that strain gages 101, 102, 103 and 104 all lie vertically disposed above or below neutral axis x-x. The neutral plane for lateral bending in the z-z direction is defined as the x-y plane, so that the strain gages will not sense bending caused by forces in the z-z direction.

Figure 3:
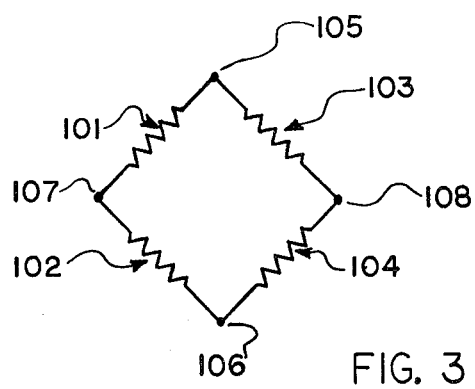
FIG. 3 is a schematic diagram of a Wheatstone bridge incorporating strain gages used with the operator member shown in FIGS. 1-2.

FIG. 3 shows the strain gages connected in a wheatstone bridge having terminals 105 and 106 for application of an excitation voltage and terminals 107 and 108 to provide an output voltage. The arrangement of the strain gages in the bridge is such that tension stresses acting on gages 101 and 104 produce positive output, and compression stresses acting on gages 102 and 103 produce positive output. Reversal of specified stresses acting on any gage will produce negative output.

Figure 4:
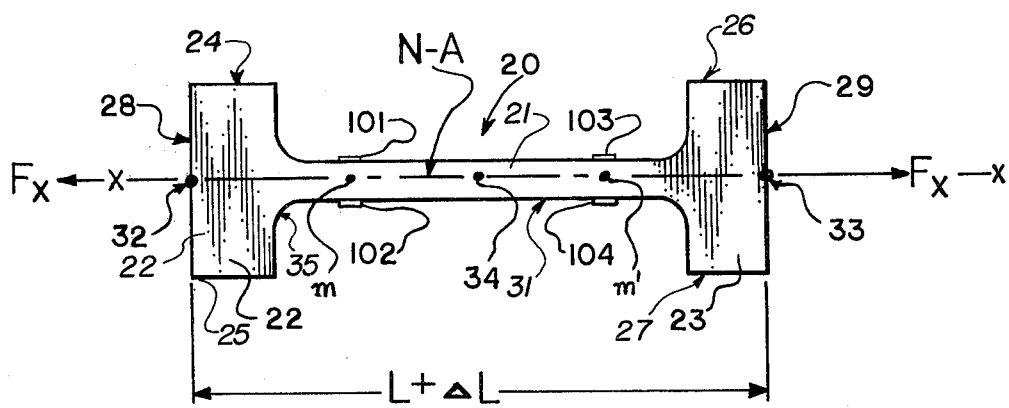
FIG. 4 is an elevational view of the operator member shown in FIGS. 1-2 which is subject to an axial load.

FIG. 4 shows the operator member being subjected to forces $F_x$, which subject the operator member 20 to axial tension along axis x-x. There is no bending, because points 32, 33, m, 34 and m' all lie along the x-x axis. Strain gages 101 and 104 are in tension to produce some positive output, and gages 102 and 103 are in tension to an equal degree to produce an equal negative output. The bridge sum of all strain gage signals is therefore equal to zero.

Figure 5:
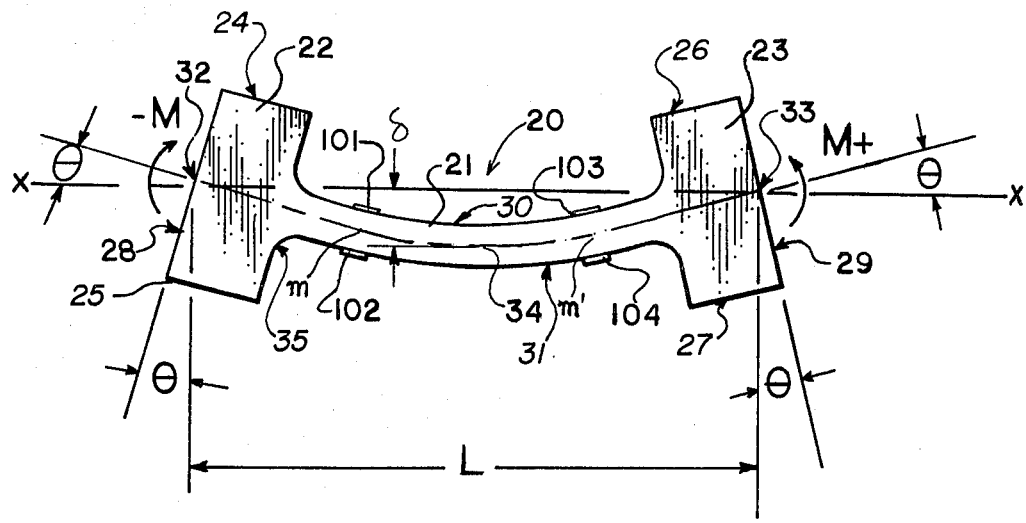
FIG. 5 is an elevational view of the operator member shown in FIGS. 1-2 which is subject to a benching moment.

Similarly, in FIG. 5, a constant bending moment acts along the entire portion 21, where bending moments $-M$ and $+M$ produce negative compression on gage 101, negative tension on gage 102, positive compression on gage 103, and positive tension on gage 104, for a bridge output of zero.

Figure 6:
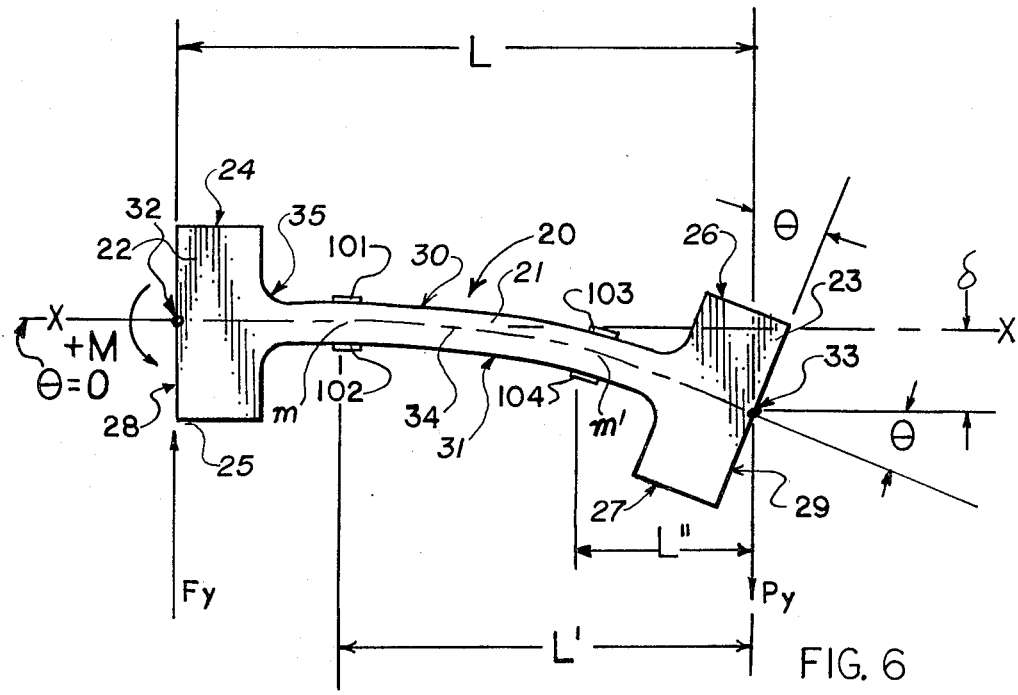
FIG. 6 is an elevational view of the operator member shown in FIGS. 1-2 which is subject to a vertical load.

In FIG. 6, a pure vertical load Py is introduced at point 33 on the face 29 of input member 23. Moment $+M$ and reaction force Fy are introduced about and through, respectively, point 32 on face 28 of support member 22. In this type of loading, the moment along beam portion 21 is not constant, being a maximum value $+M$ at the support member an diminishing to zero at point 33. Therefore, the moments at point m is greater than the moment at point m'. Gages 101 and 102 are producing positive output signals proportional to (Py)(L'), and gages 103 and 104 are producing negative outputs proportional to (Py)(L"). The bridge output is therefore proportional to Py (L'-L"), which is the obvious relationship of bending stress at different points on a cantilever beam.

It should be noted that the length L of the neutral axis between points 32 and 33 can be treated substantially as a constant for small values of deflection δ, because it is an old and common characteristic in the art bending beams that small deflections cause insignificant changes in length of neutral axis.

From the foregoing, it can be seen that the total output of the strain gage bridge is unaffected by lateral horizontal forces in the z-z direction, by axial forces in the x-x direction or by moments which are constant along the length of flexure beam portion 21. The bridge output will only be proportional to vertical force Py, provided that Py is introduced at point 33, and further provided that supporting moments and forces are introduced about and through, respectively, point 32.

The criticality of locations at which load forces and support reactions are introduced into load measuring operator members is well known in the art. Therefore, I have shown, in FIGS. 7 through 9, one arrangement of structure, and in FIGS. 10 through 14, a modified arrangement of structure embodying my invention. A pair of operator members 20a and 20b are common to both embodiments, in which all reference numerals followed by letters, a, b, c, d, e and f, or by primes (' and ") are similar to corresponding numerals of FIGS. 1 through 6.

Figure 7:
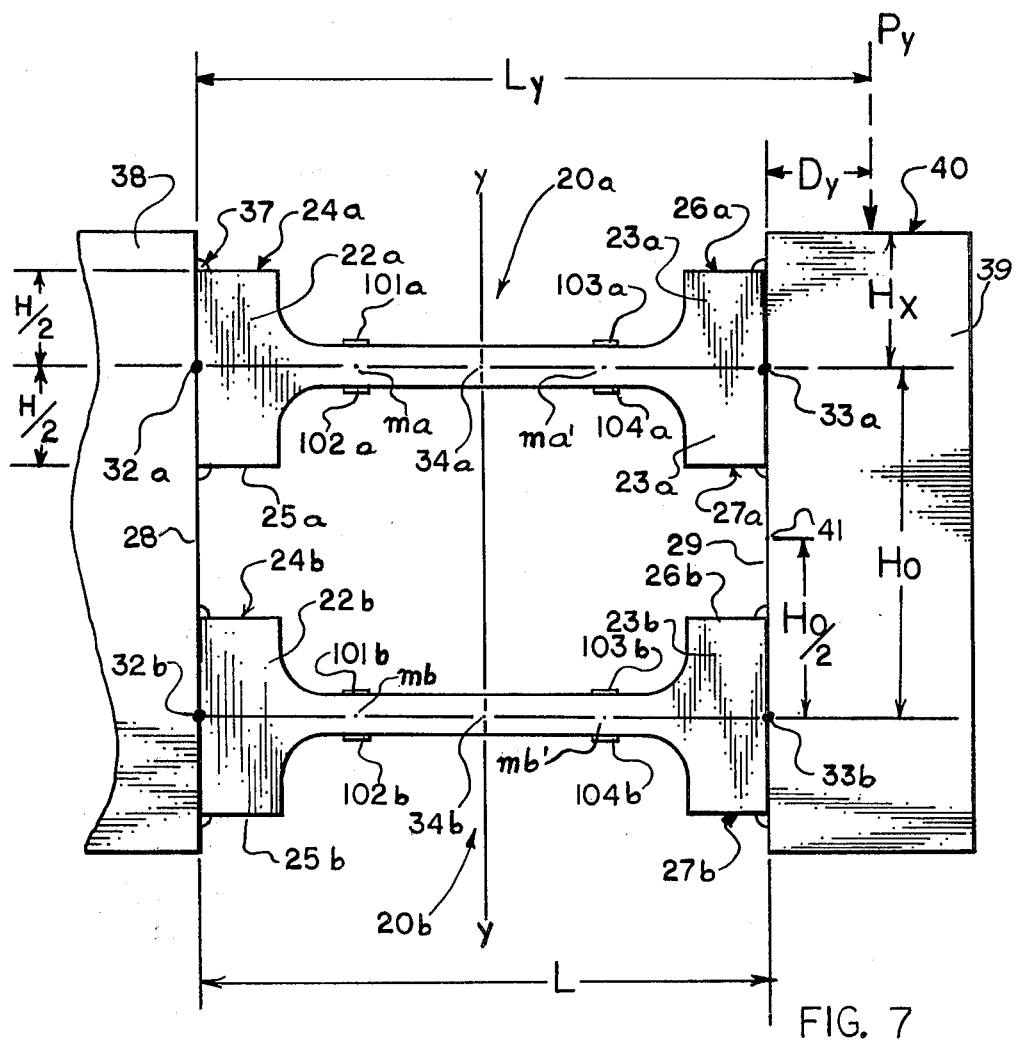
FIG. 7 is an elevational view of a first embodiment of the present invention having a pair of load-sensitive operator members connected to a relatively rigid support structure.

In FIG. 7, a pair of load sensitive operator members 20a and 20b are connected to a relatively rigid support structure 38 by means of typical welds 37 at support flanges 22a and 22b, so that, for all practical purposes, the plane 28 is substantially flat and includes the mating vertical surfaces of structure 38, flange 22a and flange 22b. Similarly, input flanges 23a and 23b are welded to relatively rigid load receiving member 39 to provide a common, substantially flat plane 29. The neutral axes of members 20a and 20b are parallel to each other and spaced apart some vertical distance Ho, while the load receiving surface 40 of member 39 can be at any elevation Hx.

Figure 8:
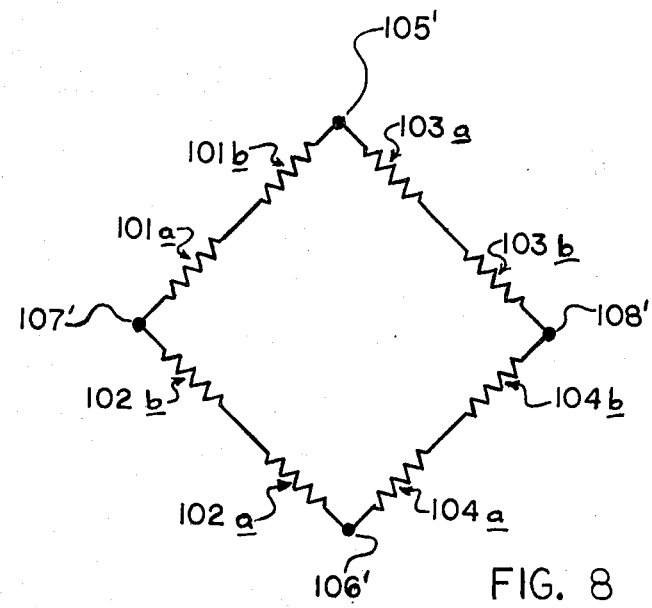
FIG. 8 is a schematic diagram of a Wheatstone bridge incorporating strain gages used with the pair of operator members shown in FIG. 7.
Figure 12:
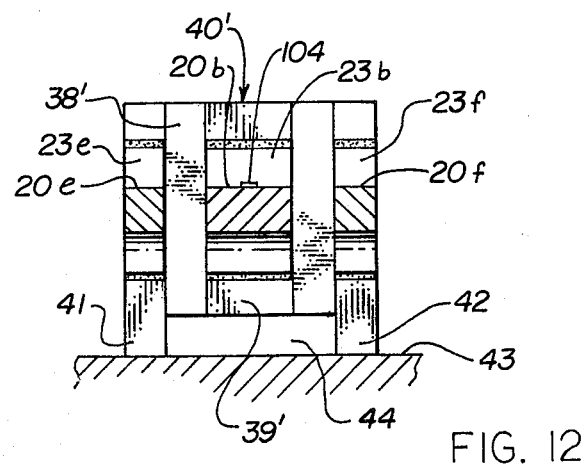
FIG. 12 is a cross-sectional view of the pair of operator members shown in FIG. 10 taken in the direction of arrows B—B.

FIG. 8 is a diagram of a wheatstone bridge in which the outputs of strain gages 101a, 101b, 102a, 102b, 103a, 103b, 104a, and 104b are summed in the same manner as in the bridge of FIG. 3.

Figure 9:
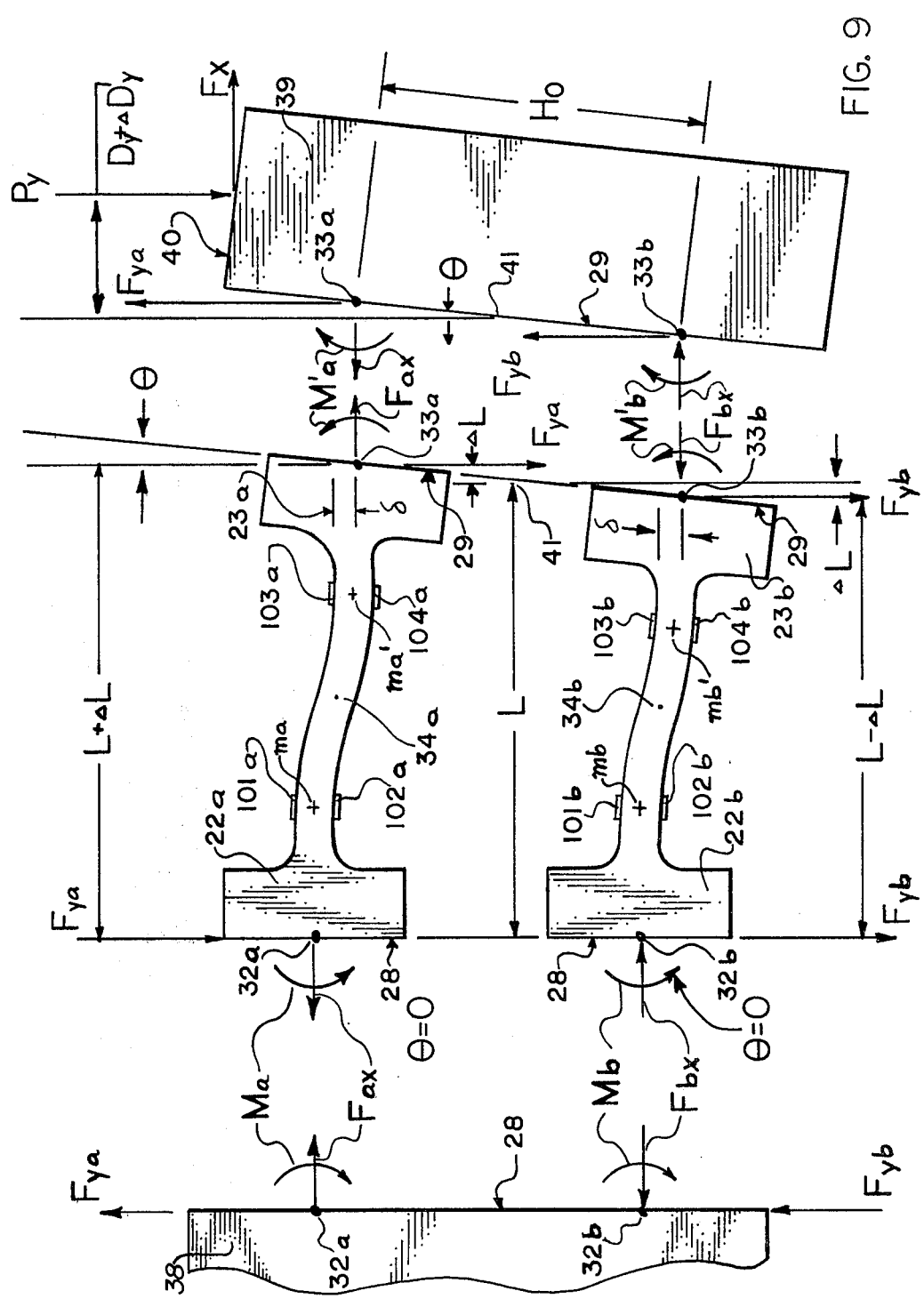
FIG. 9 is an elevational view of the pair of operator members shown in FIG. 7 with the members being shown as free bodies.

In the force diagram of FIG. 9, in which the individual items 39, 20a, 20b and 38 are shown as free bodies, it can be seen that the vertical force vectors Fya and Fyb act through points 33a and 33b, respectively, of operator members 20a and 20b. Moments M'a and M'b act about those points 33a and 33b, and axial forces F'ax and F'ab also act through points 33a and 33b, respectively. Because the end faces of both input flanges 23a and 23b lie in common plane 29, and because points 32a and 33b are spaced equidistantly above and below point 41, any increase ΔL in length L of member 20a will be offset by an equal decrease ΔL in length L of member 20a. Therefore, the vertical forces being summed by the flexure beams 21a and 21b will be proportional to (Fya)(L+ΔL) plus Fyb (L−ΔL).

Since Fya plus Fyb equals Py, the strain gage bridge output will be proportional to (Py)(L), and such bridge output will not be affected by the position of the load Py as shown located a horizontal distance Dy or (Dy+Dy) from point 41.

Location of the load Py, as well as any horizontal load Px parallel to axis x-x, will affect the values of M'a, F'ax, M'b and F'bx. Moment M'a will not necessarily be equal to moment Ma about the point 32a of support flange 22a, nor will moment M'b necessarily be equal to moment Mb. Such inequality results from restraining the slope of surface 29 to equal angle θ relative to vertical axis y-y of FIG. 7, where the sine of θ is equal to 2ΔL/Ho.

Such restraint of slope of, for example, input flange 23a will cause a constant moment of some value to be present along the entire length of member 20a, which constant moment is cancelled out by the strain gages. The force couple (Fax)(2δa) also creates a constant moment on member 20a, where the force couple may vary with Dy, ΔDy, and Px.

However, since moment Ma is not equal to M'a, the differential between moments taken at points ma and ma' will create a bridge output signal. Further, since angle θ is small for the expected range of applied load Py, the bending of the neutral axis of flexure beam 21a will characteristically be a reflex curve with a point of inflection at point 34a.

Operator member 20b will behave in similar fashion to that of member 20a, above, and a point of inflection will also occur at point 34b. However, points 34a and 34b will not be vertically aligned.

Since the moment at points ma and mb subject gages 101a and 101b to tension and subject gages 102a and 102b to compression, those gages will generate a positive signal from the wheatstone bridge. Similarly, gages 103a and 103b are subjected to compression and gages 104a and 104b are subjected to tension and will also create a positive signal. Even though the magnitudes of positive signals will not necessarily be equal, the sum of all signals will produce a bridge output that is proportional only to load Py.

Figure 13:
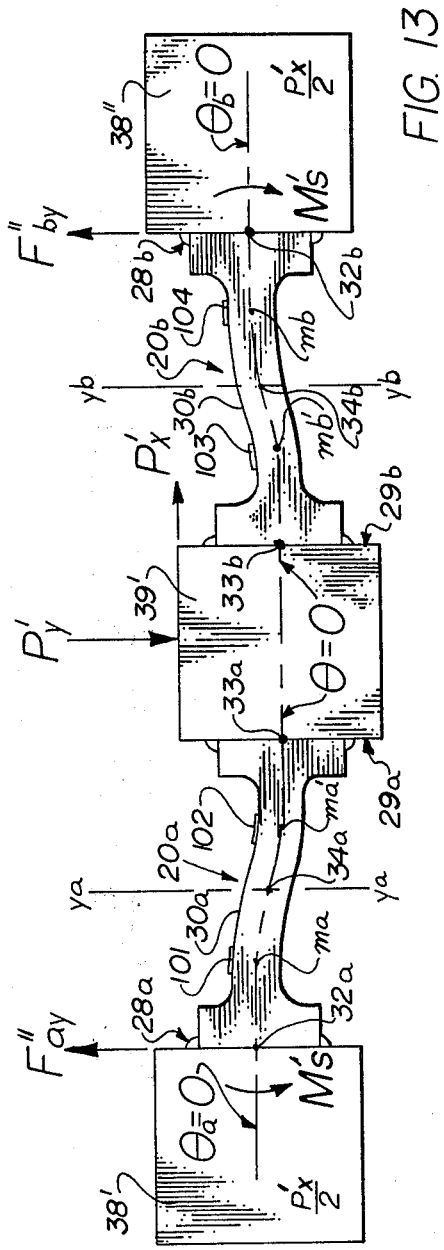
FIG. 13 is an elevational view of the second pair of operator members shown in FIG. 10 which are subject to a vertical load.
Figure 14:
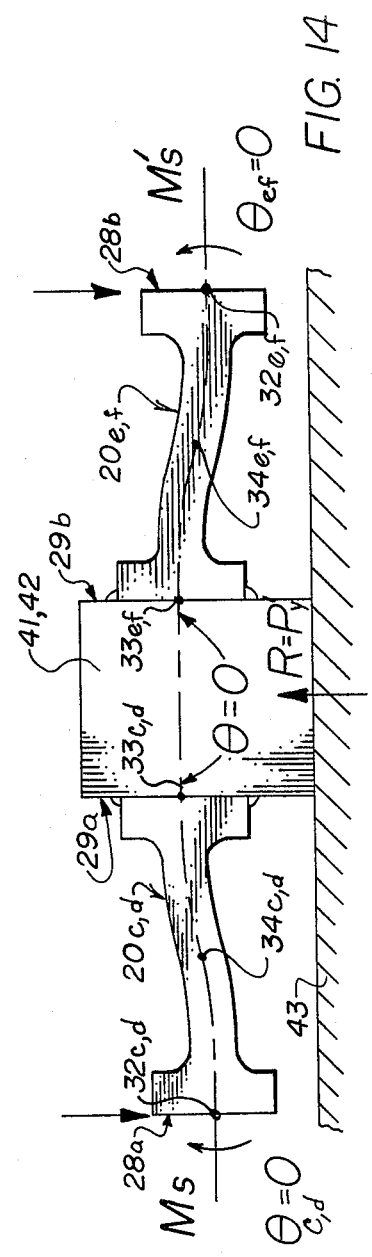
FIG. 14 is an elevational view of the second pair of operator members shown in FIG. 10 which are subject to an axial load.

Now referring to FIGS. 10 through 14, another embodiment of my invention utilizes the same operator members 20a and 20b, except for relocating the strain gages. Gages 101 and 104 are located on top surfaces 30a and 30b, respectively, to sense positive tension above points ma and mb, respectively. Gages 102 and 103 are located above points ma' and mb', respectively, to sense positive compression as can be seen in FIG. 13. Gages 101, 102, 103 and 104 are electrically connected in the wheatstone bridge of FIG. 3.

In this embodiment of my invention, load receiving member 39' is connected to input flanges 23a and 23b by means of typical welds 37'. Similarly, support flanges 22a and 22b are welded to supports 38' and 38'', respectively. Supports 38' and 38'' are in turn supported by support flexure members 20c, 20d and 20e, 20f, respectively. Continuing, members 20c, 20d, 20e and 20f are connected to vertical faces 29a and 29b of posts 41 and 42.

Support flexure members 20c, 20d, 20e and 20f each have support flanges corresponding to 22a and input flanges corresponding to 23a, and such support flexure members are identical to operator members 20a and 20b, except that the width of the support flexure members is one half of the operator member width b, being shown as b/2 in FIG. 10.

Common plane 29a includes the appropriate mating faces of items 20a, 20c, 20d, 39', 41 and 42. Similarly, plane 29b is common to appropriate mating faces of items 20b, 20e, 20f, 39', 41 and 42.

Posts 41 and 42 are sufficiently deep to rest on base 43 and still maintain clearance 44 for downward deflection of members 38', 39' and 38''. Posts 41 and 42 are welded to base 43 as shown by typical welds 37''.

The dimensions of members 39', 41', 42', 38' and 38'' are such that they are rigid with respect to the flexibility in bending of flexure portions 21a through 21f. Therefore, a load Py introduced into the center of surface 40 will cause bending such that angle $\theta$ will be substantially equal to zero at all of points 33a through 33f and 32a through 32f. Further, a horizontal force P'x, introduced into load receiving member 39', will cause the length of members 20a, 20e and 20f to increase by $\Delta L$ and will cause the length of members 20b, 20c and 20d to decrease by the same amount $\Delta L$, so that strain gage outputs will be substantially unaffected as previously described relative to the embodiment shown in FIGS. 7 through 9.

Non-symmetrical loading of the system shown in FIGS. 10 through 14 will cause moments Ms and M's to not be equal to each other, but any rotation of face 28a will substantially equal rotation of face 28b, so that faces 28a and 28b will be substantially parallel to each other. By integrity, face 29a will remain parallel to face 29b at member 39', and the ultimate support structure comprising posts 41 and 42 will retain parallelism among their vertical faces.

While not shown in the drawings, it should be obvious from inspection of, for example, FIGS. 10 through 14, that all of items 20a through 20f, 39', 40, 41, 38' and 38'' could be machined from one integral piece of material without departing from the novelty or modifying the functions of my invention. In the case of such an integral combination, the device would still be weldable to the base 43 and retain the advantages of my invention, in that no attachments or parts or introduction of applied load or reactive forces are made to the flexure beam portions 21. In summary, the only devices connected to the flexure beam portions 21a and 21b are the strain gages.

In the above manner, two cantilever members 20a and 20b are utilized to measure applied force in a selected direction with substantially no effect from method of applying the load or applying reactions to the load.

While the foregoing description has been directed to measuring vertical forces parallel to axis y-y, it will be obvious from inspection of the drawings that axes x-x and y-y can be rotated by an angle of 90° about axis z-z, in which case the force sensitive direction would be horizontal. Also, while loads Py and P'y have been shown as compressive forces against load faces 40 and 40', respectively, reversing the direction of the loads Py and P'y to act in tension would create a signal from the wheatstone bridge that would be equal in magnitude to the compression signal, but would have an opposite electrical polarity.

Figure 15:
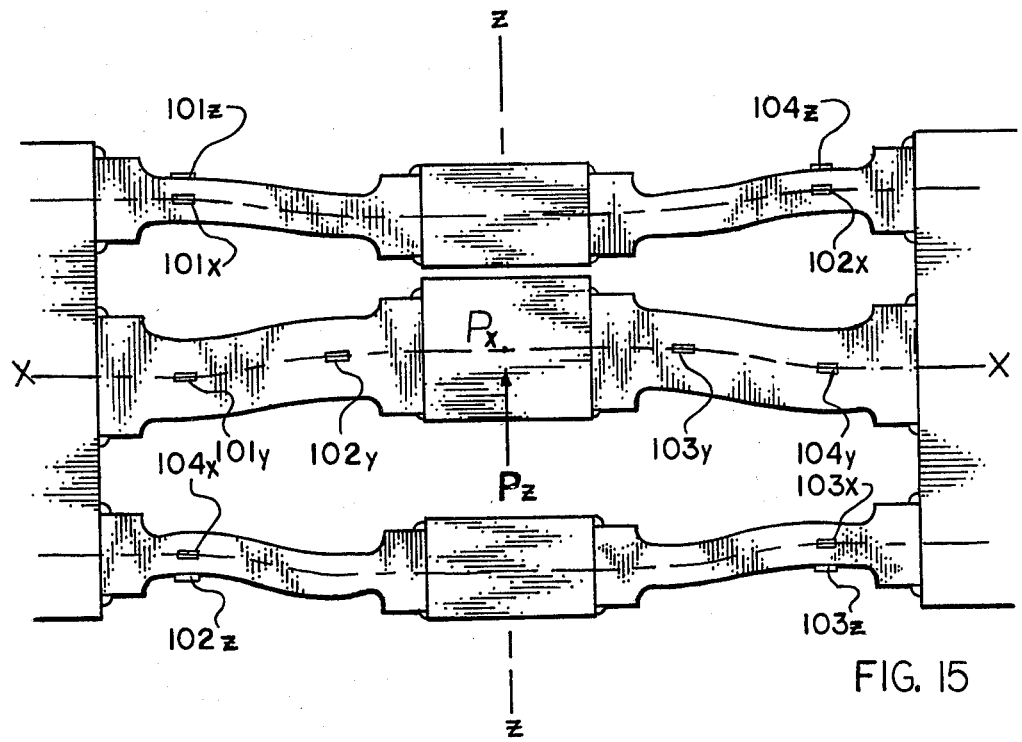
FIG. 15 is an elevational view of a modification of the present invention.
Figures 16A, 16B:
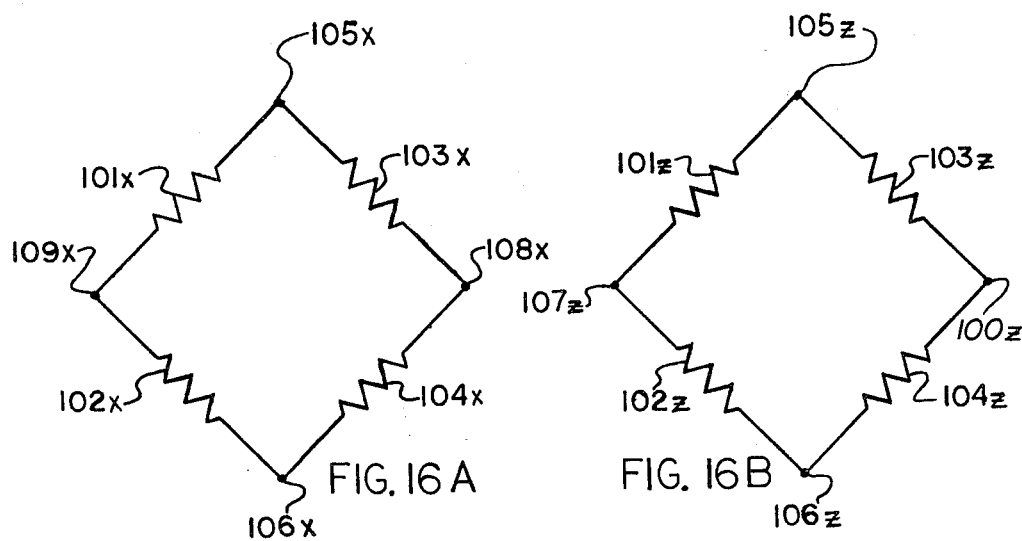
FIGS. 16A and 16B are schematic diagrams of Wheatstone bridges incorporating strain gages used with the modification shown in FIG. 15.
Figure 17:
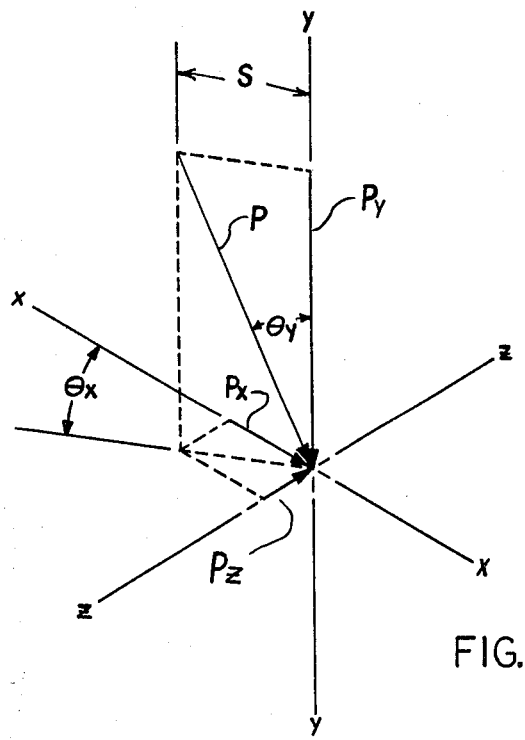
FIG. 17 is a diagram illustrating how a force can be applied from any direction against the modification shown in FIG. 15.

FIGS. 15, 16 and 17 show features which can be added to my invention where it is desirable to measure forces Py, Px and Pz independently of each other.

In FIG. 15, strain gages 101x and 104x are in tension and gages 102x and 103x are in compression. In the bridge of FIG. 16A, those gages are electrically connected so that the bridge output will be proportional only to force vector Px.

Strain gages 101z, 102z, 103z and 104z are similarly connected in the bridge of FIG. 16B to provide an output proportional only to force vector Pz.

In FIG. 17, a force P from any direction is shown in relation to axes x-x, z-z and y-y. Let Ex, Ez and Ey be the output voltages of the bridges of FIG. 16A, 16B and 3, respectively. By calibrating these voltages to read directly in force units:

Ex = Px
Ez = Pz
Ey = Py $$\tan \theta_x = \frac{Ez}{Ex}$$

$$s = \sqrt{Ex^2 + Ez^2}$$

$$\tan \theta_y = \frac{S}{Ey}$$

$$P = \sqrt{S^2 + Ey^2}$$

It is therefore possible to determine the magnitude of a force P from any direction by measuring three vectors Px, Pz and Py. Further, the vector measurements can be utilized in the above equations to determine the direction of force P relative to each of the axes x-x, z-z and y-y.

Figure 18:
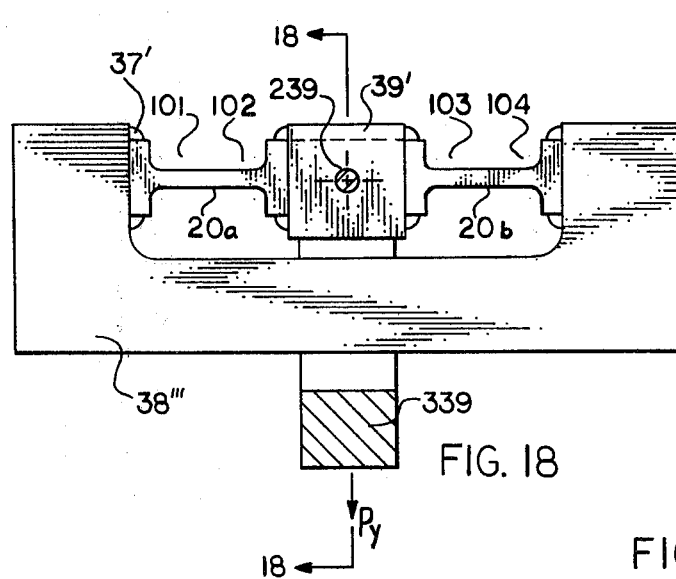
FIG. 18 is a cross-sectional view of a third embodiment of the present invention taken along line 19—19 of FIG. 19.
Figure 19:
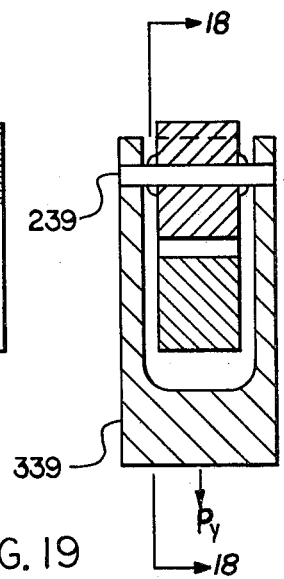
FIG. 19 is a cross-sectional view of the embodiment shown in FIG. 18 taken in the direction of arrows 18—18.

Now referring to FIGS. 18 and 19, a pair of axially aligned beams 20a and 20b have attached strain gages 101, 102, 103 and 104. The strain gages are electrically connected in a Wheatstone bridge as shown in FIG. 4. Rigid and integral support member 38''' maintains the opposite outer ends of beams 20a and 20b parallel to each other by means of typical welds 37'. Rigid load receiving member 39' maintains the innermost ends of the beams parallel to each other by means of welded attachment. Member 39' contains a pin 239 to provide a pair of load connecting points laterally spaced on each side of member 39'. Yoke 339 transmits force Py into the load receiving structure of pin 239 and member 39'. Rigid support 38''' may be mounted to any suitable carrying or base structure to hold the apparatus in position.

The load Py need not be centered along the y-y axis. Yoke 339 contacts pin 239 at two points, and load forces need not be equal at the two points for reasons heretofore discussed relative to other embodiments of the device.

Having described my invention, I claim:

1. A force measurement device wherein a tension strain gage and compression strain gage are secured to a beam, and tension and compression strain gages being connected in a Wheatstone bridge circuit, the improvement comprising: rigid flange portions on each end of the beam, said flange portions extending symmetrically from the neutral axis in a direction perpendicular to the neutral axis of the beam; and means symmetrically supporting the beam through the rigid flange portions about the neutral axis on one end of the beam from locations symmetrically spaced from the neutral axis of the beam a distance greater than the distance the strain gages are spaced from the neutral axis such that when force is applied to the other rigid flange portion an output signal from the Wheatstone bridge circuit is related to the magnitude of force applied to the rigid flange portion.

2. The force measurement device of claim 1 with the addition of a second beam member having rigid flange portions on opposite ends thereof; a rigid load receiving member secured to rigid flange portions on adjacent ends of each of said beam members; and support means secured to the rigid flange portions on outer ends of said beam members, said support means and said load receiving member being mounted such that the inner two rigid flange portions which are secured to the load receiving member are maintained parallel to each other and the outer two rigid flange portions are maintained parallel to each other as the magnitude of a force applied to the load receiving member is changed.

3. A force measurement device according to claim 2 wherein said support means comprises: a pair of rigid support blocks secured to the rigid flange portions on outer ends of said beam members, said support blocks extending laterally outwardly from said beam members; two pairs of support flexure members, each of said support flexure members having a width which is one-half the width of said beam members and having rigid end flange portions; means securing end flange portions of said support flexure members to said rigid support blocks such that a support flexure member is positioned on opposite sides of and parallel to each support beam; and a pair of rigid posts secured between adjacent rigid end flange portions on said support flexure members, said posts being positioned adjacent opposite sides of said load receiving member.

4. A force measurement device according to claim 2, said strain gages being arranged such that a first tension strain gage is secured to the first beam member and a second tension strain gage is secured to the second beam member, said first and second tension strain gages being spaced equidistance from the center of the load receiving member in a direction parallel to the aligned neutral axes of the first and second beam members, and such that a first compression strain gage is secured to the first beam member and a second compression strain gage is secured to the second beam member, said first and second compression strain gages being spaced equidistance from the center of the load receiving member in a direction parallel to the aligned neutral axis of the first and second beam members, said first tension and said first compression strain gages be spaced equidistance from the center of the first beam member and said second tension and second compression strain gages being equidistance from the center of the second beam member.

5. A force measurement device according to claim 4 with the addition of tension and compression strain gages secured to upper surfaces and side surfaces of said support flexure members to deliver output signals related to the magnitude of force vectors in two mutually perpendicular directions.

6. A force measurement device comprising: first and second beam members, said beam members being axially aligned; a rigid load receiving member secured between ends of the first and second beam members and symmetrically about neutral axes of the first and second beam members to maintain adjacent ends of the first and second beam members parallel and axially aligned with each other adjacent the rigid load receiving member; a rigid support member secured to opposite ends of said first and second beam members, said rigid support member being of integral construction to symmetrically support said beam members about neutral axes of the beam members to maintain outer ends of said first and second beam members parallel and axially aligned with each other; and means secured to the first and second beam member to indicate the magnitude of flexure of the first and second beam members resulting from application of a load to the rigid load receiving member.

* * * * *

UNITED STATES PATENT AND TRADEMARK OFFICE
CERTIFICATE OF CORRECTION

PATENT NO. : 4,420,985

DATED : December 20, 1983

INVENTOR(S) : Seymour H. Raskin

It is certified that error appears in the above-identified patent and that said Letters Patent is hereby corrected as shown below:

Column 4, line 33, "32a" should read -- 33a --.

Column 7, line 27, "and" first occurrence, should read -- said --.

Signed and Sealed this

Twenty-third Day of October 1984

[SEAL]

Attest:

GERALD J. MOSSINGHOFF

Attesting Officer

Commissioner of Patents and Trademarks